United States Patent Office.

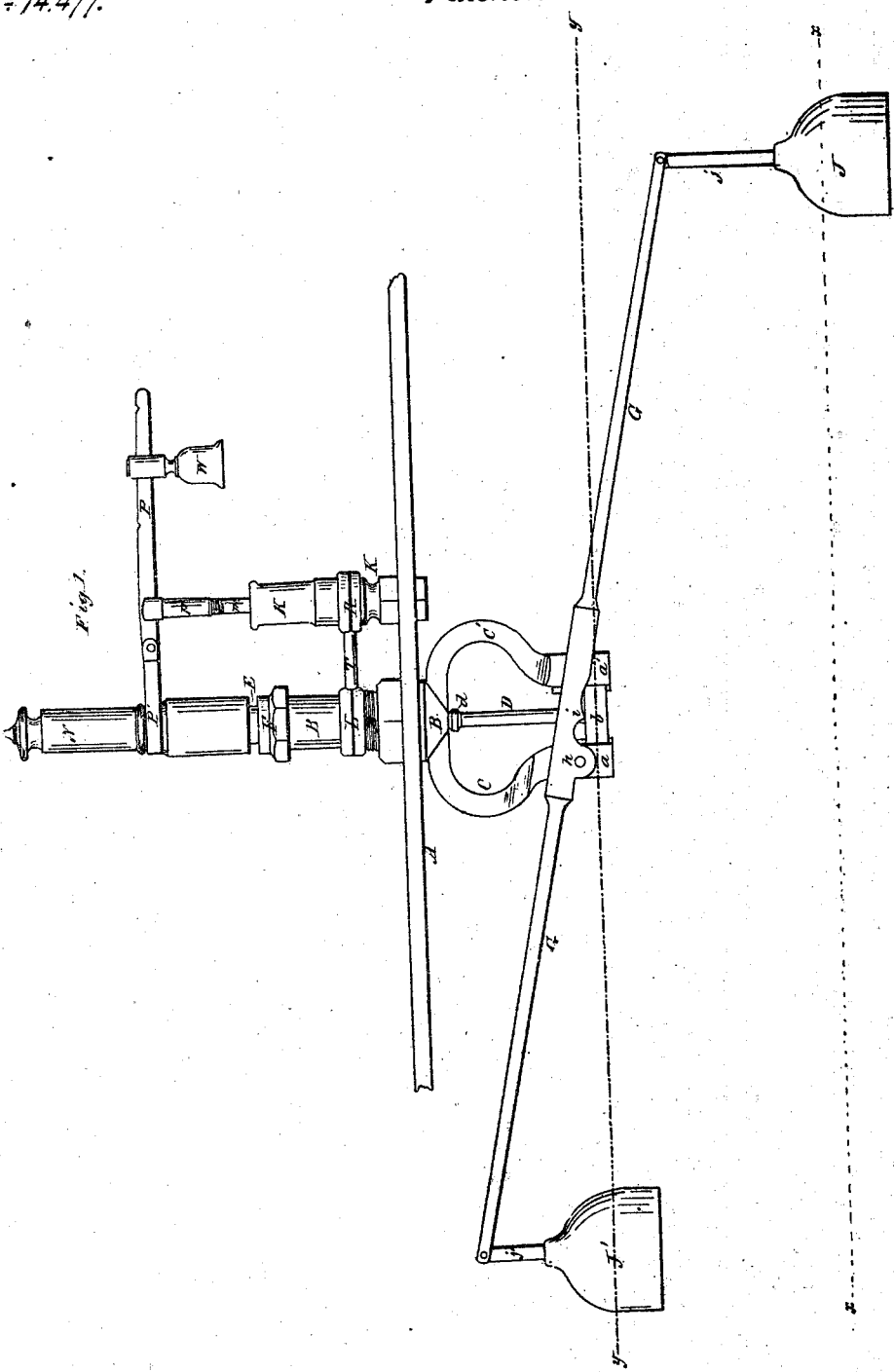

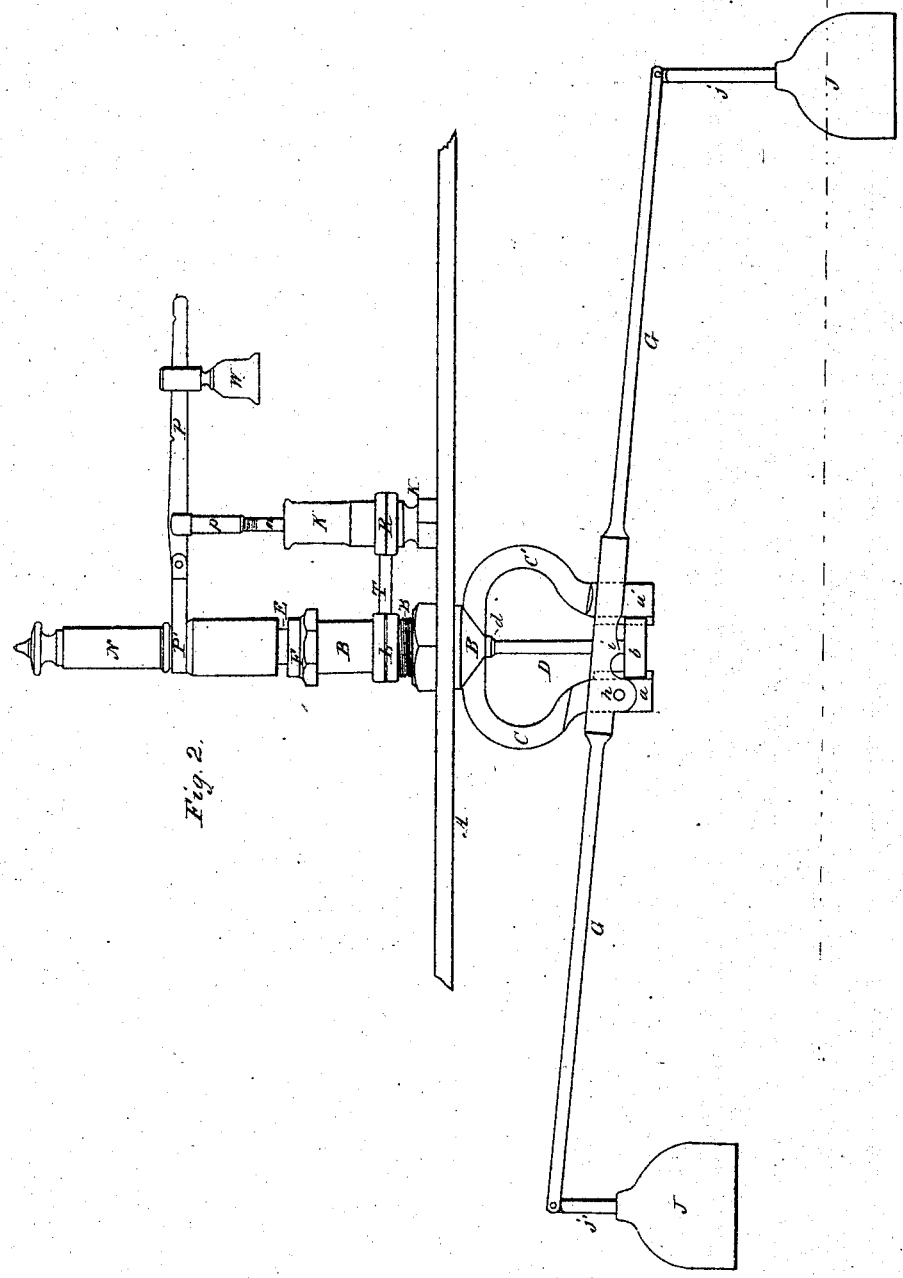

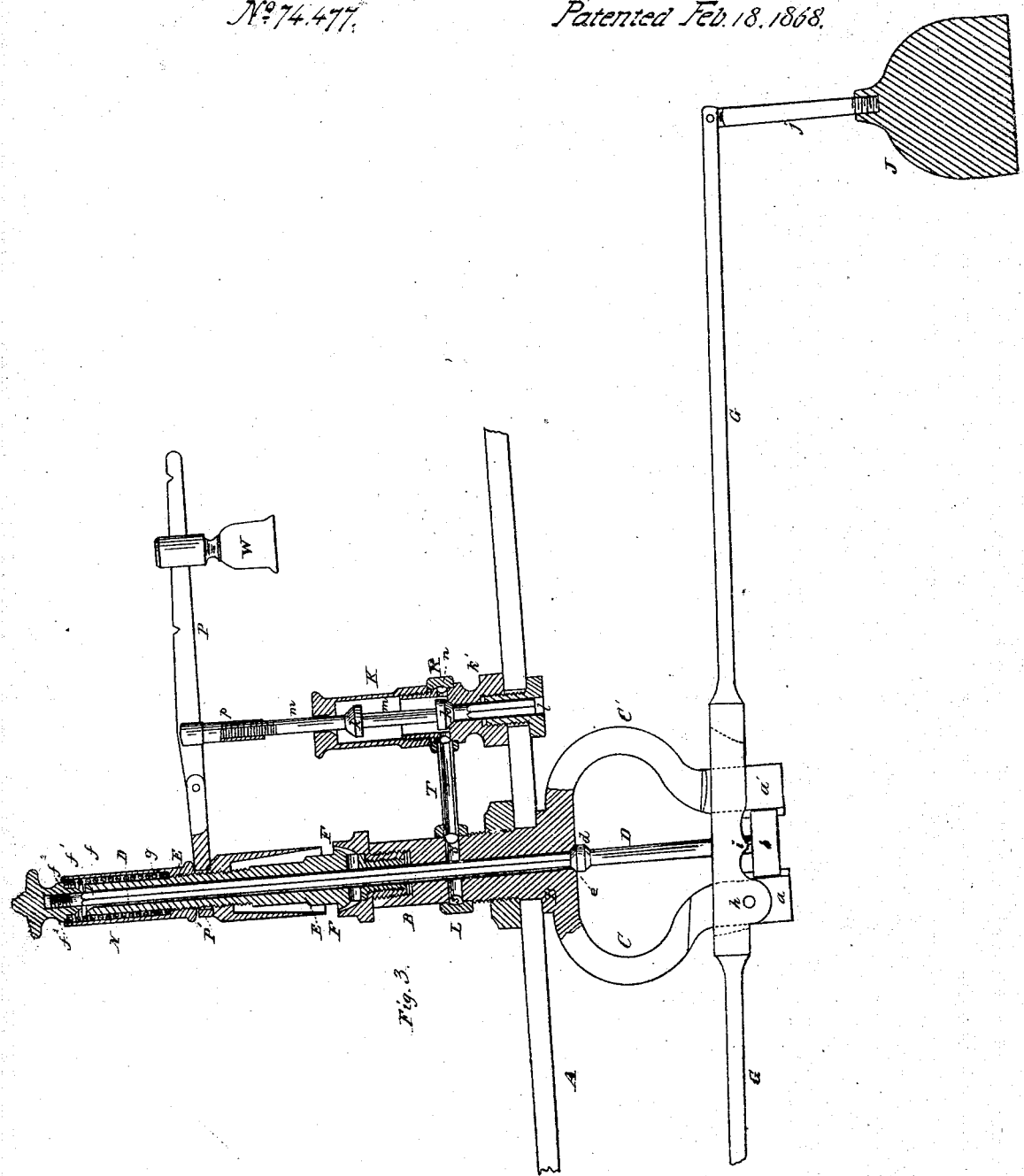

THOMAS P. AKERS, OF NEW YORK, N. Y.

Letters Patent No. 74,477, dated February 18, 1868.

---

IMPROVEMENT IN HIGH AND LOW-WATER ALARMS FOR STEAM-GENERATORS.

---

The Schedule referred to in these Letters Patent and making part of the same.

---

TO ALL WHOM IT MAY CONCERN:

Be it known that I, THOMAS P. AKERS, of New York city, in the county and State of New York, have invented an Improved Automatic Gravitating Boiler-Alarm; and I do hereby declare that the following is a full, clear, and exact description thereof, reference being had to the accompanying drawings, making part of this specification, in which—

Figure 1, sheet 1, is an elevation of my improved indicator, showing the parts in position for sounding an alarm at either high or low water.

Figure 2 represents the parts in a position which they will assume when the water in a steam-boiler is at its medium height.

Figure 3, sheet 2, is a vertical central section of the improved indicator with a safety-valve attached.

Similar letters of reference indicate corresponding parts in the several figures.

The principal object of this invention is to provide certain and reliable means which shall sound an alarm, or indicate in any other suitable manner when the water in steam-boilers is either too high or too low; and another object of the invention is to combine a safety-valve with a low and high-water indicator in such manner as to sound an alarm at any desired point of steam-pressure.

The nature of the first part of my invention consists in the employment, within the water and steam-space of a steam-boiler, of pendulous solids, of greater specific gravity than water, which are suspended from the extremities of a lever, and adjusted in such relation to the fulcrum of this lever, that when the water in the boiler is at its mean height, these solids shall be counterpoised by the buoyancy of the water acting upon one of them, and when the water is either too high or too low in the boiler, one of said solids shall preponderate, and thereby operate, through the medium of the said lever, upon certain devices, which will sound an alarm, substantially as will be hereinafter described.

The invention also consists in providing for adjusting and regulating the amount of opening of a valve communicating with a steam-whistle or other suitable alarm, when said valve is employed as a medium, through which certain pendulous solids, which are arranged upon the arms of a vibrating-lever within a steam-boiler shell, shall indicate either high or low water in such boiler, as will be hereinafter described.

It also consists in having the lever, which carries the pendulous solids, so pivoted that it shall not operate upon the alarm-valve while the water in the boiler stands at mean height, but should the water fall too low, or become too high in the boiler, then one of the pendulous solids shall descend and operate said valve, as will be hereinafter described.

The second part of my invention consists in having a safety-valve so constructed and arranged within a cylinder that communicates with the alarm-whistle of a high and low-water indicator, that this valve will rise under any given pressure of steam in the boiler, and sound an alarm, as will be hereinafter described.

To enable others skilled in the art to understand my invention, I will describe its construction and operation.

In the accompanying drawings, A represents the crown-sheet of a steam-boiler, through which a cylinder, B, is passed, and secured steam-tight in any suitable manner. Upon the lower end of this cylinder two curved arms, C C', are formed, the lower straight ends $a\ a'$ of which are adapted for receiving between them and serving as guides for a horizontal vertically-sliding block, $b$, into which the lower end of a valve-stem, D, is tapped, as shown in fig. 3. This valve-stem has a cone-valve, $d$, upon it, which is adapted to fit steam-tight into a seat, $e$, which is formed in the lower partially-closed end of cylinder B.

Into the upper end of cylinder B, outside of the boiler, a tube, E, is tightly screwed, having applied to it a steam-whistle, F, which may be constructed as shown in fig. 3, or in any other well-known manner, so as to sound an alarm when the steam is admitted into the tube E from the boiler. The upper end of the tube E has a valve-seat, $f$, formed in it for receiving the adjustable valve $f^1$, which is screwed upon the upper extremity of the valve-stem D, and preventing the escape of steam from the upper end of said tube when the valve $d$, on stem D, is depressed. The valve $d$ is forcibly held up to its seat by means of the helical spring $g$, shown in fig. 3, which is enclosed within a cylindrical jacket surrounding the tube E above the whistle, and which presses upward against a shoulder, $f^2$, upon the swelled head of valve $f^1$, as shown in fig. 3. By taking hold of the head of valve $f^1$ and rotating the valve-stem D, the block $b$ can be raised or depressed, and set to operate at any desired point with reference to the desired height of the high and low-water lines in the boiler, as will be hereinafter described.

G represents a vibrating-beam or lever, which has an oblong slot made through it for receiving the vertical ends, $a\ a'$, of the arms or hangers C C', which ends keep this lever in place laterally, but allow its arms to vibrate freely in a vertical plane. The lever G is pivoted to the hanger C at $h$, so that one arm of this lever shall be somewhat longer than the other, and from these arms two solid balls or bodies, J J', of any suitable shape or size, are hung, by means of rods j j', which are pivoted so that they will hang vertically in every position which the lever may assume. Both of the solid bodies J J' are made of an equal size, weight, and shape, so that they will both displace an equal bulk of water when immersed in water.

These two bodies, J J', are so adjusted with relation to the fulcrum h of lever G, that when the body J is allowed to find its level in water, the two bodies J J' will be counterpoised. By this means I am enabled to employ solids which are of greater specific gravity than water, and cause one of them, J, to float or be buoyed in water, as indicated in figs. 1 and 2. As the solid body J', on the shortest arm of the lever G, is designed to counteract the weight of the body J, on the longest arm of this lever, when the weight of the water which this body, J, displaces is added to it, the rod j' is made short enough to prevent the body J' from touching the water when at its mean height in the boiler. Under these conditions, the body J will rise and descend with the water in which it floats, while the body J' is out of the water, but should both of these bodies J J' be immersed in water, which can only occur when the water rises too high in the boiler, as indicated by line y y in fig. 1, then the body J will descend to its fullest extent and assume the same position which it does when the water in the boiler descends below the low-water mark x x, which is also indicated in fig. 1.

This principle of counteracting the weight of a solid body, of greater specific gravity than water, by means of a weight and the buoyancy of the water combined, I employ for sounding an alarm when the water in a steam-boiler becomes too low, as well as when, in the act of feeding a boiler, the water rises too high. This is done by having the projecting knife-edges i, which are formed upon lever G at an intermediate point between guides a a', impinge upon the step-block b, when the solid body J descends too far, in consequence of too high or too low water, as above described, which will depress this block, and with it the valve-stem D, thereby allowing of the escape of steam, and causing an alarm.

While the water is at medium height in the boiler, the projections, i, of lever G will not touch the block b, which latter, together with its valve-stem, will be forcibly held up by the spring g and pressure of steam, or, if no spring be used, the pressure of the steam alone will hold them up.

Having described my improved mode of sounding an alarm at high and low water in a steam-boiler, I will now describe the manner of sounding an alarm under an excessive pressure of steam in the boiler.

Within a vertical cylinder, K, which is located near the steam-whistle F, and which communicates with the steam-space in the boiler through aperture l, are two cone-valves, k k', which are applied upon a stem, m, that passes through the head and foot, k', of this cylinder, as shown in fig. 3. The upper part of the stem m receives upon it a vertically-adjustable support, p, in the upper end of which is a slot for receiving the beam P. This beam is provided with a weight, W, for holding down the safety-valve k, and allowing this valve to rise at any desired point of steam-pressure in the boiler. Beam P is pivoted to a circular collar, P', which is applied to the reduced cylindrical head of the whistle-cap and held in place by the jacket N, around spring g, as shown in the drawings, fig. 3.

Surrounding the hollow foot-piece, K', of the valve-box or cylinder K, is a groove, which communicates with the interior of this foot by means of perforations n, and around this grooved portion of the foot-piece is tightly fitted an annular collar, R, which may also have a groove in its inner surface matching the groove in said piece. The collar L, which is applied around the cylinder B, in the same horizontal plane as collar R, encloses an annular groove, and a number of perforations, s, entering said cylinder. These two collars being connected together by the pipe T, the steam, which will enter cylinder K from the boiler when the pressure is too great therein, will pass through this pipe into the cylinder B, and sound an alarm by the whistle F. When safety-valve k is opened, the check-valve k will be closed, consequently no steam will escape through the hole made through the upper end of the cylinder K.

By this very simple arrangement, the same whistle which is employed to give an alarm at high or low water, is also caused to sound an alarm for excessive steam-pressure in the boiler.

Having described one practical mode of carrying my invention into effect, what I claim as new, and desire to secure by Letters Patent, is—

1. The employment of two weights, of greater specific gravity than water, inside of a boiler, said weights being arranged so as to be subject to the action of high and low water within the boiler, substantially as described.

2. A combined high and low-water indicator, which is controlled by weights, of greater specific gravity than water, applied upon the unequal arms of a lever, which is hung within the boiler, in such a manner that, while the weight upon the longer arm shall so far preponderate as to open a valve at certain points of either high or low water, such preponderance will be counteracted by the water when at any intermediate point, substantially as described.

3. The combination of the steam-whistle F, alarm-valve d, vibrating-lever G, and weights J J', of greater specific gravity than water, arranged within a boiler, substantially as and for the purpose described.

4. The combination of the slide-step b, valve-rod D, with its valve, and the projection i of the lever G, substantially as and for the purpose described.

5. The combination of the slide-step block b, valve-rod D, and the adjusting-device at the top of said rod, substantially as and for the purpose described.

6. The devices L T R, or their equivalents, constructed substantially as described, in combination with the safety-valve and the steam-whistle, for the purpose set forth.

THOS. P. AKERS.

Witnesses:
R. T. CAMPBELL,
EDW. SCHAFER.